US008539825B2

(12) United States Patent
Beckwith et al.

(10) Patent No.: US 8,539,825 B2
(45) Date of Patent: Sep. 24, 2013

(54) ADJUSTABLE SIMULATOR APPARATUS AND METHOD FOR TESTING VEHICLE COMPONENTS

(75) Inventors: Timothy J. Beckwith, Berlin Heights, OH (US); Duane R. Johnson, Wellington, OH (US); Jeffrey D. Szalkowski, Brunswick Hills, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 151 days.

(21) Appl. No.: 13/166,240

(22) Filed: Jun. 22, 2011

(65) Prior Publication Data
US 2012/0325029 A1    Dec. 27, 2012

(51) Int. Cl.
*G01M 15/00*    (2006.01)
(52) U.S. Cl.
USPC ...................................... 73/118.01
(58) Field of Classification Search
None
See application file for complete search history.

(56) References Cited

U.S. PATENT DOCUMENTS

| | | | | |
|---|---|---|---|---|
| 4,156,534 A | * | 5/1979 | Salomon | 280/612 |
| 4,768,460 A | * | 9/1988 | Soon-Fu | 116/272 |
| 4,922,762 A | * | 5/1990 | Loring | 73/862.473 |
| 7,219,966 B2 | | 5/2007 | Young | |
| 7,331,641 B2 | | 2/2008 | Kusano | |
| 2005/0182609 A1 | | 8/2005 | Kurrle | |
| 2010/0113966 A1 | * | 5/2010 | Spruce | 600/557 |

* cited by examiner

*Primary Examiner* — Robert R Raevis
(74) *Attorney, Agent, or Firm* — Eugene E. Clair; Cheryl L. Greenly

(57) ABSTRACT

Various embodiments of an adjustable simulator apparatus for testing vehicle components are disclosed herein. The apparatus can be used to test linearly translatable components, such as transmission or brake components, without connecting them to every cooperating component as they would be in a vehicle. In one embodiment, an adjustable simulator apparatus includes a housing having a bore along a generally longitudinal axis and a first retainer and a second retainer disposed in the housing and spaced apart from one another. At least one of the first and the second retainer is adjustable in its position and a compressible member is disposed between the retainers. The apparatus further includes a piston translatable within the bore and a mechanical stop disposed at least partially within the bore of the housing and extends through the second end of the compressible member.

13 Claims, 4 Drawing Sheets

ADJUSTABLE SIMULATOR APPARATUS AND METHOD FOR TESTING VEHICLE COMPONENTS

BACKGROUND

The present invention relates to an adjustable simulator apparatus and simulator system that can be used during the design and testing of vehicle components, and a method of simulation. More specifically, the present invention relates to an adjustable simulator apparatus and simulator system that can test the response of a vehicle component that is activated by one or more related vehicle components.

Throughout a product development cycle, the design performance of one or more vehicle components is typically tested through simulation. The performance of components in a manual transmission system or a brake system, for example, can be determined under various component designs or arrangements. A vehicle operator actuates a clutch pedal to shift gears and remotely actuates the clutch pressure plate of a transmission system. A brake pedal remotely actuates a drum or disc brake assembly. The pedal displacement and force required to actuate the remote components can vary based on each type of pedal installation and component manufacturer. Therefore, it is difficult to determine whether a newly designed pedal or associated assembly would have the specified linear displacement and withstand the force required to actuate the remote components for the multiple types of commercial vehicles.

Testing and validation of brake pedals and transmission clutch pedals is needed across a broad range of vehicle installations, without incurring the cost and the complexity of installing the test clutch pedals in multiple commercial vehicles. If components such as transmission pedals and brake pedals are tested at temperature extremes, a remotely mounted simulator apparatus is desirable. Also, if components are tested for durability, a robust simulator apparatus is desired so that the components can be mechanically actuated through thousands of cycles. It is not cost effective or practical to obtain and connect an entire manual transmission or braking system outside of a vehicle.

For the foregoing reasons, there is a need for an improved simulator apparatus and method which addresses the above-referenced problems.

SUMMARY

Various embodiments of an adjustable simulator apparatus and simulator systems are provided herein. In one embodiment, an adjustable simulator apparatus includes a housing having a bore along a generally longitudinal axis; a first retainer and a second retainer disposed at least partially inside the housing and spaced apart from one another along the longitudinal axis. At least one of the retainers is adjustable along the longitudinal axis to change the distance of spacing between the retainers. The adjustable simulator apparatus further includes a compressible member having a first end and a second end disposed between the first retainer and the second retainer such that the compressible member is compressible along the bore of the housing, and a plate is disposed within the bore between the first retainer and the second retainer and between the first retainer and the compressible member, the plate having a first face and a second face. The second face of the plate is in contact with the compressible member. A mechanical stop is disposed longitudinally within the bore of the housing and extends at least partially within the compressible member and through the second end of the compressible member. The apparatus also includes a piston translatable within the bore to come into contact with the first face of the plate to move the plate from a first, or start, position to a second, or stop, position.

In another embodiment, the adjustable simulator apparatus further includes a piston. In another embodiment, the adjustable simulator apparatus further includes a slave cylinder. The slave cylinder includes a push rod that is in contact with a piston when the slave cylinder is connected to the housing of the adjustable simulator apparatus.

In yet another embodiment of the present invention, a method for simulating test vehicle components includes adjusting at least one of a first retainer and a second retainer of an adjustable simulator device to set a pre-load on a compressible member disposed between the first retainer and second retainer; adjusting a mechanical stop in the adjustable simulator device so that the mechanical stop passes at least partially through the compressible member and the mechanical stop is positioned a pre-determined distance from a plate that is disposed between the first retainer and the compressible member; and moving a piston linearly so as to overcome the pre-load of the compressible member until the piston has traversed the predetermined distance and is stopped by the resistive force of the mechanical stop.

Since each vehicle device, for example, transmissions, engines, and brakes has different force profiles required for actuation, depending on its manufacturer, the various embodiments of the invention described herein allow simulation to test the performance of a variety of different vehicle manufacturers' devices.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
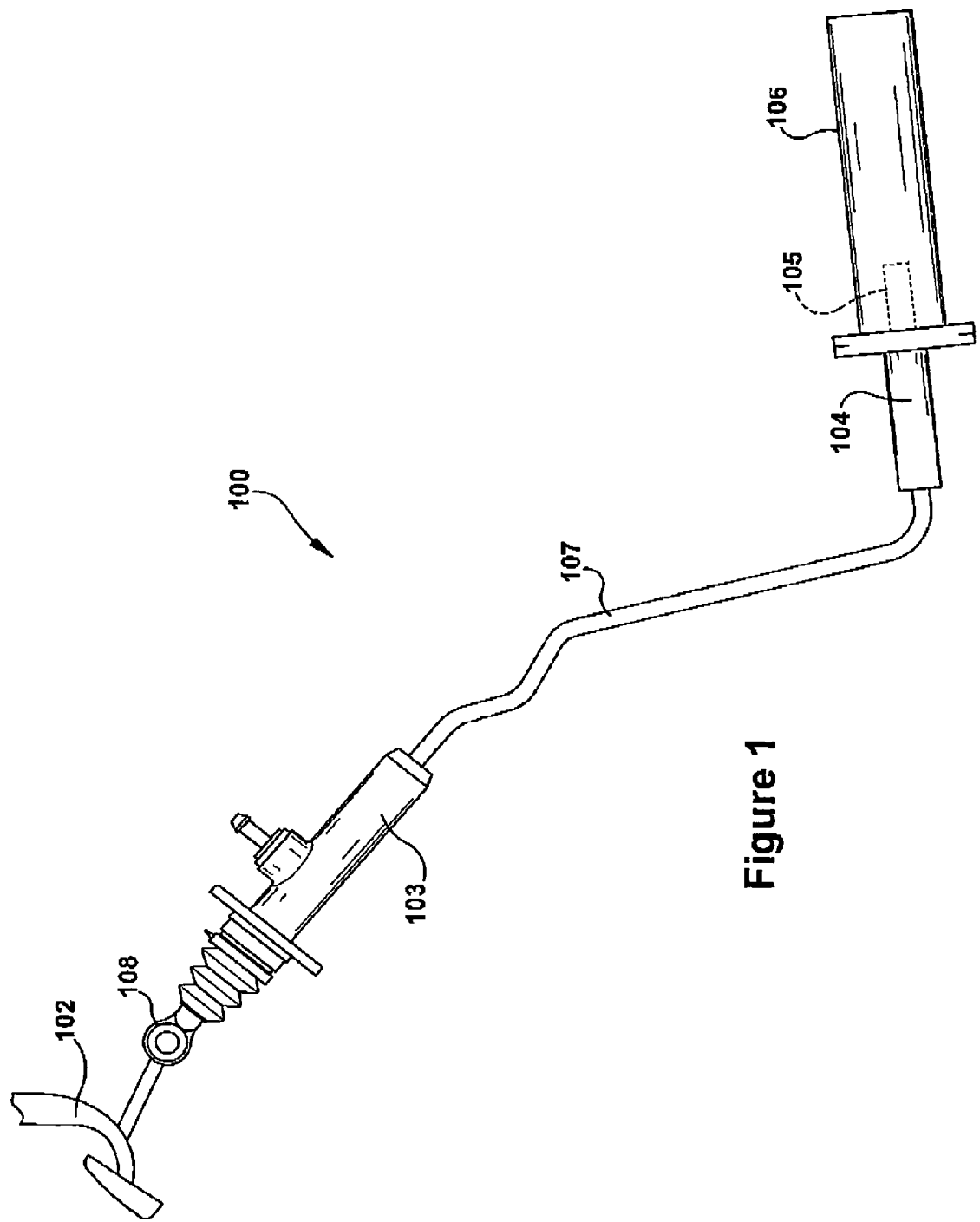
FIG. 1 illustrates a schematic representation of an adjustable simulator system including an adjustable simulator apparatus, according to an embodiment of the present invention.

FIG. 1 is a schematic illustration of an adjustable simulator system 100 according to an embodiment of the present invention. The adjustable simulator system 100 includes a pedal 102, a master cylinder 103, a slave cylinder 104 and an adjustable simulator apparatus 106. The adjustable simulator system 100 is described herein with respect to a manual transmission, however, it is understood that the adjustable simulator system can pertain to a wide variety of automotive systems, including but not limited to, a brake system for example. FIG. 1 shows that pedal 102 is connected by a mechanical connector 108 to the master cylinder 103. The master cylinder 103 is connected by a fluid connector 107 to the slave cylinder 104. The slave cylinder 104 includes a linearly translatable push rod 105. The slave cylinder 104 is operatively connected to the adjustable simulator apparatus 106.

The adjustable simulator apparatus 106 finds particular application in testing pedal-actuated systems, such as for example, a clutch pedal for a manual transmission or a brake pedal for a brake system, although several additional applications are contemplated. The adjustable simulator apparatus 106 allows a component, such as a transmission clutch pedal or brake pedal, to be tested by varying the pre-load on the component and the displacement of the component. The adjustable simulator apparatus 106 can be utilized as part of the simulator system 100 to determine if the pedal 102, associated pedal hardware (not shown) and the pedal mounting surface (not shown) can overcome a variety of different pre-loads as the pedal would encounter if the pedal were actually connected to a manual transmission or braking system.

In actual use, the transmission clutch pedal or brake pedal is located in a vehicle cab compartment and is actuated by a vehicle operator when it is desirable to change gears in the manual transmission or to apply brakes. When the pedal 102 is actuated, a hydraulic pressure is provided from a master cylinder 103 via the hydraulic connector 107 to a remotely mounted component, such as a slave cylinder 104. In a typical installation, the slave cylinder 104 would be located adjacent to a clutch plate mechanism, (not shown) of the manual transmission (not shown) in the engine compartment. The clutch plate mechanism is the interface between slave cylinder 104 and the transmission. The linear movement of the push rod 105 in the slave cylinder 104 creates a normal force that disengages the clutch plate mechanism within the body of the manual transmission. The pedal displacement and force required to actuate the clutch plate mechanism can be different based on each type of pedal installation and manual transmission manufacturer. In this application example described above, the adjustable simulator apparatus 106 of FIG. 1 is a substitute for a commercial vehicle manual transmission clutch plate mechanism. That is, the pedal 102, the master cylinder 103, the slave cylinder 104 and the related mounting and hardware can be tested under certain mechanical and environmental conditions independent of the actual manual transmission found in a vehicle when the adjustable simulator apparatus 106 is coupled to the slave cylinder 104.

While embodiments of the present invention are described with respect to simulating a commercial vehicle transmission clutch plate mechanism, other applications, such as brake pedal test systems, are also contemplated. A pedal to be simulated can also be a brake pedal that is likewise depressed by an operator. The brake pedal is operatively connected to a master cylinder and the master cylinder fluidly communicates with a piston to create the normal force required to move the brake assembly. The force and the travel limitation or displacement for the brake pedal is determined by the master cylinder, piston and brake assembly.

Figure 2:
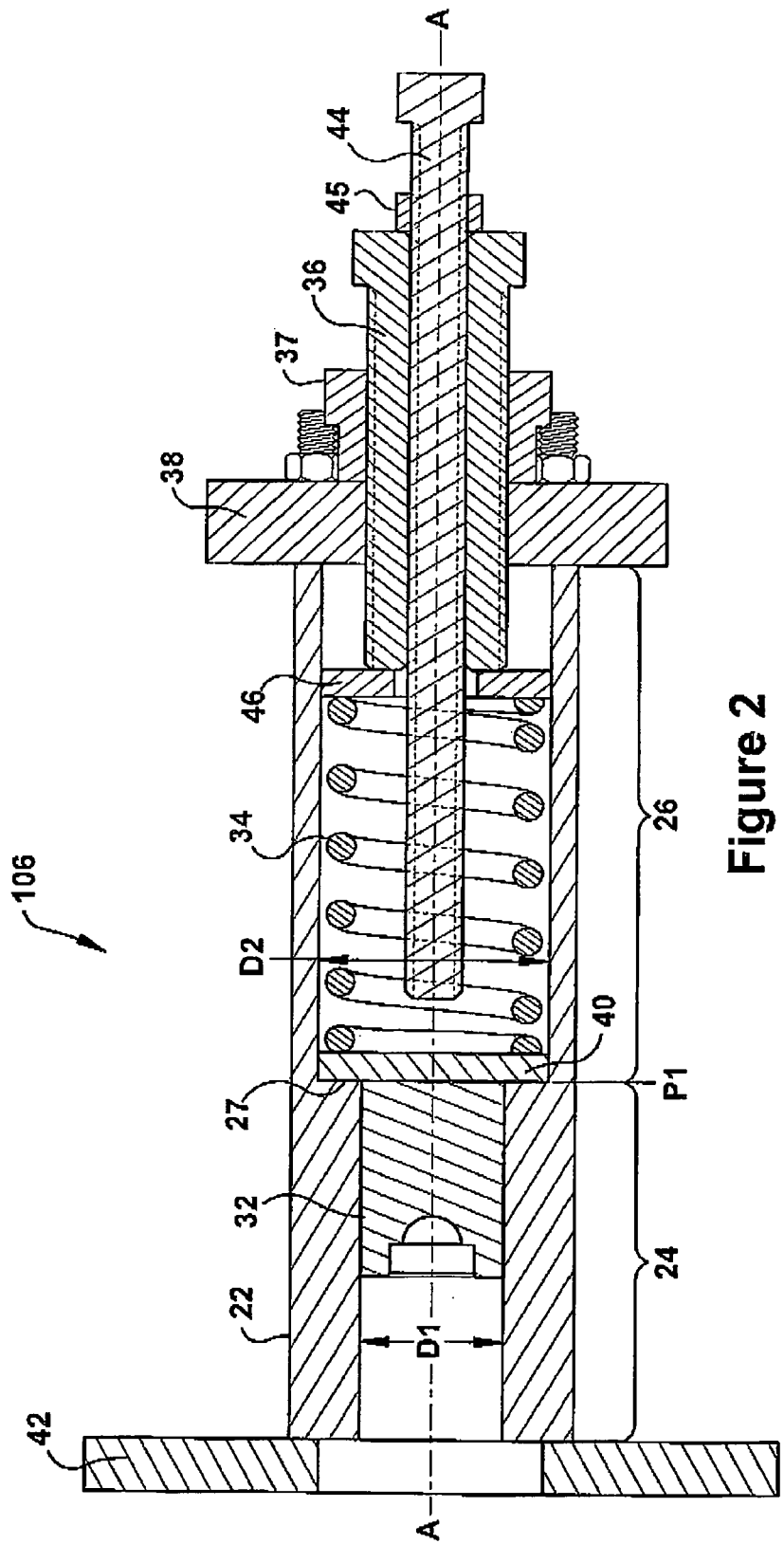
FIG. 2 illustrates the cross-sectional view of the adjustable simulator apparatus of FIG. 1, according an embodiment of the present invention.

With reference to FIG. 2, a sectional view of the adjustable simulator apparatus 106 is provided. The adjustable simulator apparatus 106 includes a housing 22, which houses a portion of the adjustable simulator apparatus 106. Housing 22 as shown and described herein as a cylindrical housing with a circular cross-section, however, it should be understood that the housing may alternative shapes with alternative cross-sections, such as square, rectangular, triangular, shapes, for example. The cylindrical housing 22 has a first portion 24 at a proximate end with a bore of a first inner diameter D1 and a second portion 26 at a distal end with a bore of a second inner diameter D2. The inner diameter of first portion 24 and second portion 26 is D1 and D2, respectively. In one embodiment, D1 is equal to D2, and in several alternative embodiments D1 and D2 are unequal. In FIG. 2, the inner diameter D1 is shown as less than the inner diameter D2. The second portion 26 optionally includes a threaded section along the inner circumference of the bore.

In one embodiment, a first retainer 27 has a surface that is generally perpendicular to a longitudinal axis A of the cylindrical housing 22. In FIG. 2, the first retainer 27 is depicted as an inwardly extending shoulder that extends inside the cylindrical housing 22 separating the first portion 24 and the second portion 26 such that the first portion 24 can vary in length relative to one another. For example, the length of first portion 24 is designed to be substantially equivalent to the length of the linearly translatable push rod 105 that is used in the adjustable simulator system 100. In alternative embodiments, the first retainer 27 can be one or more of a variety of components. A snap ring or a sleeve (not shown) inserted into the bore of the cylindrical housing 22 may also serve as the first retainer 27.

A piston 32 is positioned to enter the housing 22 at the first portion 24. The piston 32 can have one of several alternative shapes and is sized to move through both the first portion 24 and the second portion 26 of the housing 22. In one embodiment the smaller inner diameter D1 of the first portion 24 of the housing 22 can be close in size to the diameter of the piston if it is used as a guide for a piston 32 so that the piston 32 stays centered on the longitudinal axis A of the housing 22.

The adjustable simulator apparatus 106 further includes compressible member 34 disposed between the first retainer 27 and a second retainer 36, which are spaced apart. Compressible member 34 is sized to fit within the bore of housing 22 and is able to be compressed along the second portion 26 of the cylindrical housing 22. Several types of spring-like elements may be used for the compressible member 34, such as, for example, a coil spring as shown, or a Belleville washer, an air cylinder or a wave washer. At least one of the first retainer 27 and second retainer 36 is adjustable along the longitudinal axis A of the cylindrical housing 22 to change the spacing between the first retainer 27 and the second retainer 36. In the embodiment shown in FIG. 2, the second retainer 36 is adjustable in position. Second retainer 36 can vary in size and shape and fits at least partially inside housing 22. In one embodiment the diameter of second retainer 36 is smaller than the inside diameter of housing 22, however, its diameter can be about equal to the diameter of the bore of the second portion 26 of the cylindrical housing 22.

In one embodiment, the second end of compressible member 34 is in direct contact with the second retainer 36 disposed in the bore of the cylindrical housing 22. For example, the second retainer 36 and compressible member 34 can be sized to come into direct contact with each other. In an embodiment, as shown in FIG. 2, the second retainer 36 is sized to pass through coils of compressible member 34, and in such case the adjustable simulator apparatus 106 includes annular washer 46 disposed between the compressible member 34 and the second retainer 36 and sized to contact both.

The adjustable simulator apparatus 106 further includes a mechanical stop 44 that extends longitudinally within the bore of the housing 22. When the piston 32 is pushed to overcome the force of the compressible member 34, the mechanical stop 44 which extends at least partially within the compressible member 34, prevents additional movement of the piston 32 along the bore. In an alternative embodiment, the mechanical stop 44 is adjustable in position so that alternative linear displacements can be tested using the adjustable simulator apparatus 106. The mechanical stop 44 may be a bolt or alternatively, a rod with only a portion of its body threaded. As shown in FIG. 2, mechanical stop 44 extends through an annular opening of second retainer 36, and optionally, is threaded along its outer surface to screw into second retainer 36.

In an alternative embodiment, the adjustable simulator apparatus 106 further includes a plate 40 disposed within the bore of housing 22 and positioned substantially perpendicular to longitudinal axis A. Plate 40 is sized such that a first face that contacts first retainer 27 and second face contacts the first end of a compressible member 34. The dimensions of the plate 40 allows movement through the second portion 26 of the cylindrical housing 22, but the first retainer 27 prevents the plate 40 from moving along the first portion 24. The cylindrical housing 22, the piston 32 and the plate 40 can be made from the same material, for example steel, however different materials are possible for each of these components.

In another embodiment, adjustable simulator apparatus 106 further includes end cap 38 which is coupled to the end of the second portion 26 of the cylindrical housing 22. The end cap 38 can further include an opening for accepting the second retainer 36, and optionally, the opening is threaded. For example, the second retainer 36 is a bolt and optionally has a threaded outer surface to engage the end cap 38 and a threaded opening. The second retainer 36 is in contact with the annular washer 46. In an alternative embodiment, the second retainer 36 is threadably engaged with the threaded section of the second portion 26 of the cylindrical housing 22 as described above.

In another embodiment the mechanical stop 44 is threaded and its position is threadably adjusted along a threaded bore 47 of the second retainer 36. The mechanical stop 44 is sized to thread through the second retainer 36 and pass through the end cap 38, the annular washer 46, and the compressible member 34 in order to contact the second face of the plate 40. The adjustable simulator apparatus 106 optionally includes nut 37 and nut 45 to lock the adjustment of the second retainer 36 and the mechanical stop 44 after the adjustment is set.

In another embodiment, the adjustable simulator apparatus 106 comprises the cylindrical housing 22 having a bore along a generally longitudinal axis A. The first retainer 27 and the second retainer 36 are disposed at least partially inside the cylindrical housing 22 and spaced apart from one another along the longitudinal axis A. The second retainer 36 is a bolt adjustable along the longitudinal axis A to change the distance the first retainer 27 and second retainer 36 are spaced apart. The compressible member 34 is disposed between the first retainer 27 and the second retainer 36 and compressible along the bore of the cylindrical housing 22. The plate 40 is disposed within the bore between the first retainer 27 and the second retainer 36 and between the first retainer 27 and the compressible member 34. The second face of the plate 40 is in contact with the compressible member 34. The mechanical stop 44 is a bolt disposed longitudinally within the bore of the cylindrical housing 22. The mechanical stop 44 extends through the second end of the compressible member 34. The piston 32 is translatable within the bore to come into contact with the first face of the plate 40. The mechanical stop 44 is adjustable along the bore to change the distance the piston 32 can travel when acting upon the plate 40.

Figure 3:
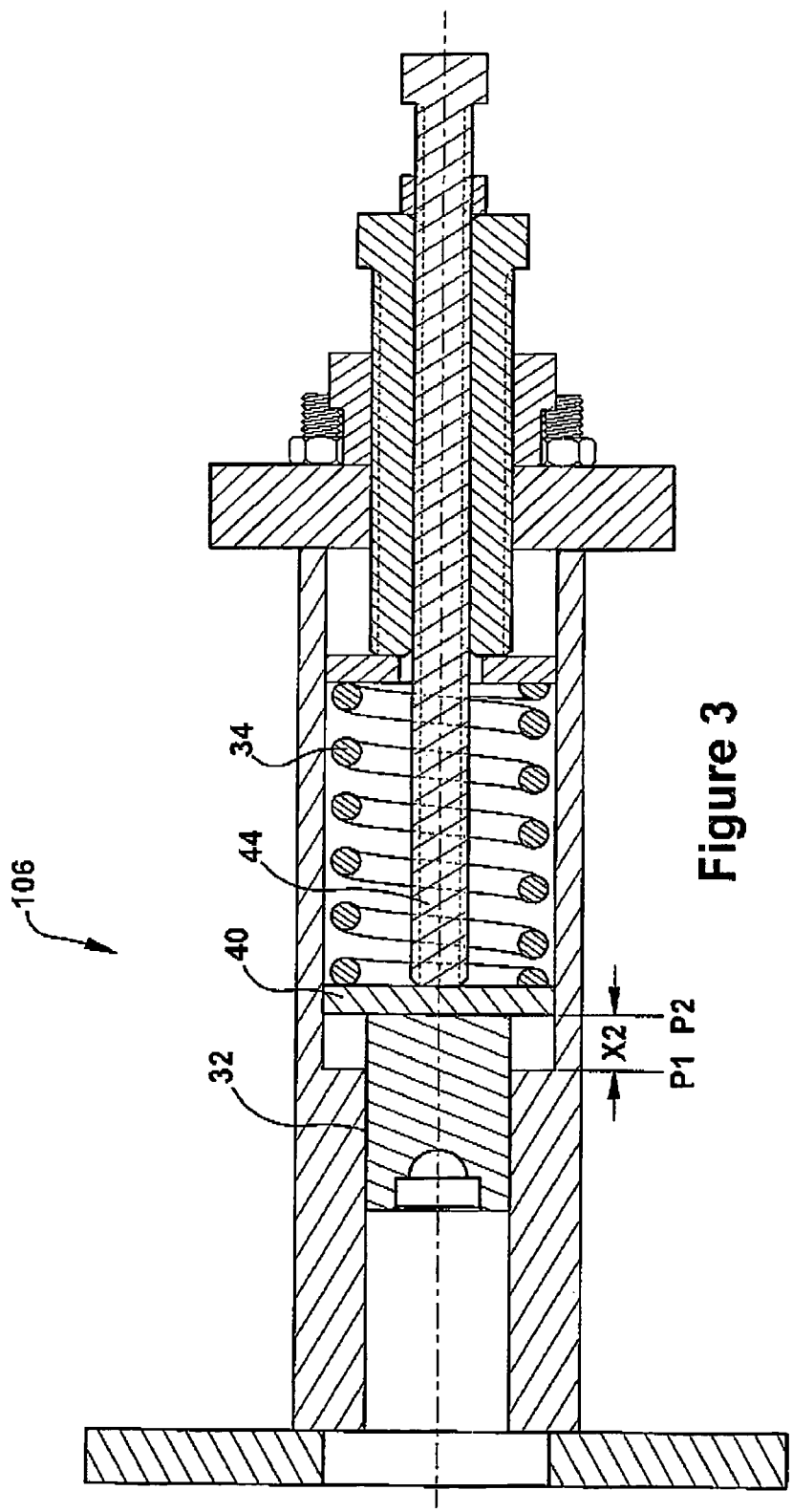
FIG. 3 illustrates a cross-sectional view of the adjustable simulator apparatus of FIG. 2 showing the piston in an extended position, according an embodiment of the present invention.

FIG. 3 is a cross-sectional illustration of adjustable simulator apparatus 106 of FIG. 2 showing the piston 32 moved from the start, or first, position P1 to a stop, or second, position P2. The piston 32 has traversed a distance X2 when it contacts the mechanical stop 44. The compressible member 34 is more compressed when the piston 32 is in the second position P2 (FIG. 3) than in the first position P1 (FIG. 2).

Figure 4:
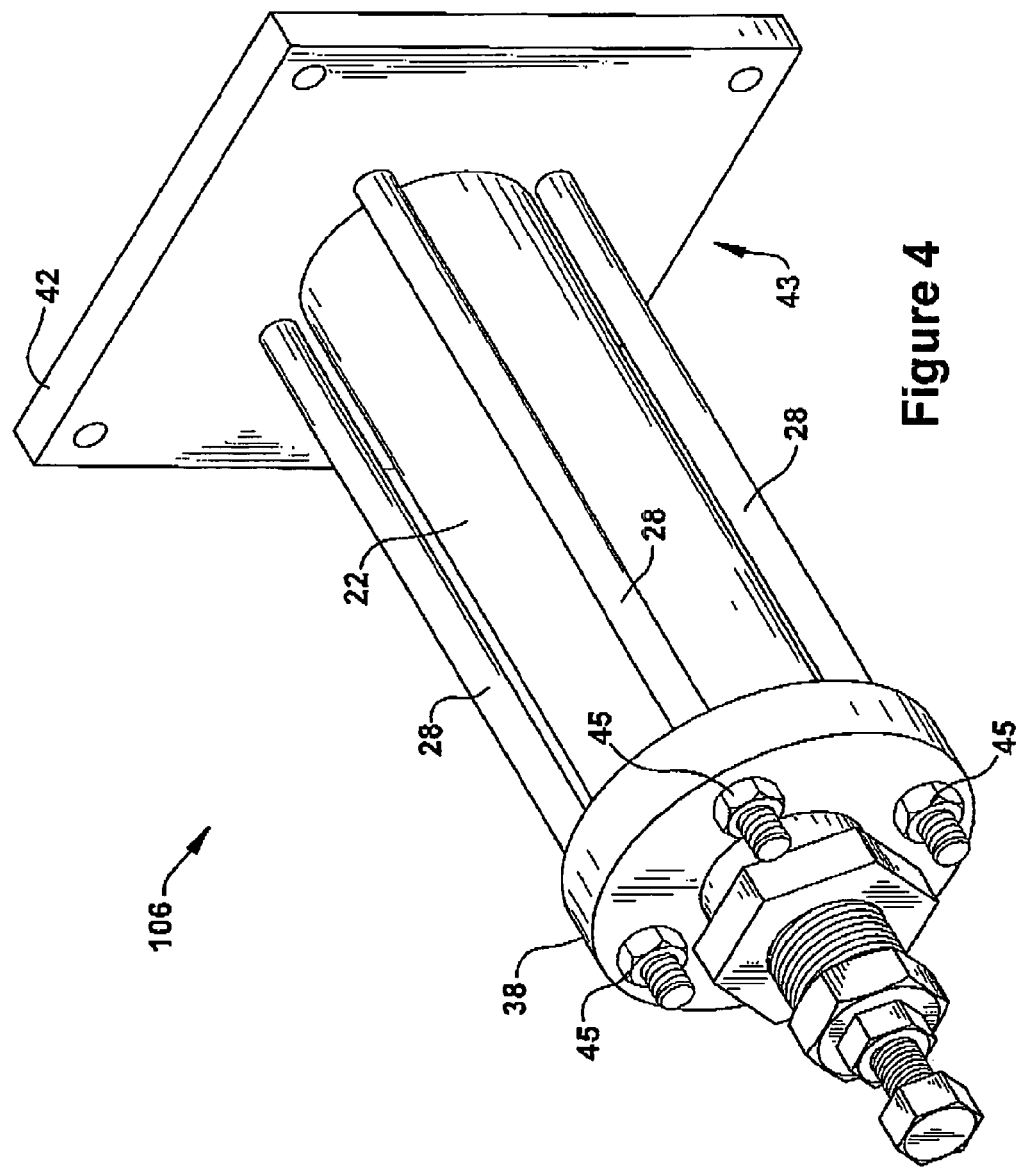
FIG. 4 illustrates a perspective view of the adjustable simulator apparatus of FIG. 2, according to an embodiment of the present invention.

FIG. 4 shows the perspective view of adjustable simulator apparatus 106 where the cylindrical housing 22 is attached to a mounting apparatus 43. The mounting apparatus 43 includes a plurality of tension rods 28, with a preferred number of tension rods being four. The tension rods 28 surround the cylindrical housing 22 such that the mounting apparatus 43 aligns the cylindrical housing 22 with the slave cylinder 104 (FIG. 1) at the first portion 24 of the cylindrical housing 22. The tension rods 28 extend from a mounting plate 42 of the mounting apparatus 43. The mounting plate 42 may be affixed to the slave cylinder 104 using bolts (not shown) or other affixation means. The mounting plate 42 and tension rods 28 hold the slave cylinder 104 in an axial relationship with the cylindrical housing 22. The end cap 38 may be affixed to the tension rods 28 by nuts 45 so that the piston 32, plate 40, compressible member 34 and annular washer 46 are held within the body of the cylindrical housing 22 by the mounting apparatus 43.

A method of simulation can be explained with reference to FIGS. 1, 2 and 3. As a force is applied to the pedal 102, a force is applied mechanically to a master cylinder 103. The master cylinder 103 in turn converts the mechanical force into a fluid force. The fluid force is sent via the fluid connector 107 from the master cylinder 103 to the slave cylinder 104. The slave cylinder 104, upon receiving a fluid force from the master cylinder 103, physically moves the integral push rod 105. The piston 32 moves linearly in response to the push rod 105, as the first end of the piston 32 is coupled to the push rod 105.

As shown in FIG. 2, the second end of the piston 32 contacts the first face of the plate 40 when the piston 32 is in the first position P1. The compressible member 34 is selected to provide a predetermined linear load. The compressible member 34 is inserted between the first retainer 27 and the second retainer 36. The second retainer 36 partially compresses the compressible member 34 to adjustably set a pre-load. The piston 32 encounters the pre-load when the piston 32 is in the first position. In this manner, the load curve provided by the adjustable simulator apparatus 106 more closely follows the load provided by the device being simulated. The pre-load for one embodiment can range up to about two hundred pounds and, more typically, from one hundred and fifty (150) pounds to about one hundred and eighty (180) pounds, although other load values are contemplated. As the piston 32 continues to move within the first portion 24 of the cylinder 22 in response to the movement of the push rod 105, the piston 32 overcomes the pre-load of the compressible member 34.

Accordingly, in one embodiment of the present invention a method for simulating a vehicle component comprises: adjusting at least one of a first retainer and a second retainer of an adjustable simulator device to set a pre-load on a compressible member disposed between the first retainer and second retainer; adjusting a mechanical stop in the adjustable simulator device so that the mechanical stop passes at least partially through the compressible member and the mechanical stop is positioned a predetermined distance away from the first retainer; and moving a piston linearly so as to overcome the pre-load of the compressible member and moving the piston the predetermined distance.

However, once the piston 32 overcomes the pre-load, the piston 32 encounters a predetermined linear load of up to about six hundred and fifty (650) pounds. For example, if the compressible member is a coil spring, the predetermined linear load is governed by the spring rate of the initially selected spring as compressible member 34. Different springs may be selected with different spring rates to provide different loads, dependent on the application. The piston 32 can encounter loads from three hundred (300) pounds to six hundred and fifty (650) pounds, dependent on the type of test desired. The predetermined load is changeable by replacing spring with a spring with a different spring rate. In one embodiment, a coil spring with a spring rate of eight hundred and twelve (812) pounds per inch is used as the compressible member 34. However, springs or other compressible members or spring elements with spring rates from 600 to 900 pounds per inch are contemplated. It is also contemplated that multiple springs with different spring rates can be placed in the cylindrical housing 22 in order to simulate a wide variety of loads.

The mechanical stop 44 acts to inhibit the motion of the piston 32. In one embodiment, the mechanical stop 44 is adjustably threaded through bolt 36, the annular washer 46 and compressible member 34. The mechanical stop 44 acts on the plate 40 to impede the motion of the plate 40 and thereby the motion of the piston 32. The piston 32 movement is stopped when the plate 40 contacts the mechanical stop 44. As shown in FIG. 3, when the piston 32 travels toward the second portion 26 of the cylindrical housing 22, the piston 32 will stop at a second position P2 when the plate 40 contacts the mechanical stop 44. The second position of the piston 32 is considered a full travel position. In this manner the amount of travel of the piston 32 can be adjusted via the mechanical stop 44 to simulate the amount of travel expected for the type of device to which the pedal 102 controls. The piston 32 can generally traverse a distance of up to about one inch, and typically, up to about six-tenths (0.6) of an inch within the cylindrical housing 22 from the first position P1 to the second position P2. The piston travel distance is shown as X2. The two different diameters D1 and D2 of the bore of the cylindrical housing 22 allow for a preload to be set while still allowing for a full linear spring load to be achieved at the full travel of the push rod 105.

As more input force is applied to the pedal 102, fluid pressure will build within the system and will allow the pedal 102 and its structure to be tested to forces higher than those required by a clutch plate mechanism on a vehicle. In this manner, the load at the pedal 102 can be simulated to the actual or greater load than the pedal would see if it were connected to an engine or transmission device. By delivering the predetermined load at a certain linear displacement using the adjustable simulator apparatus 106, the technician can determine if the pedal, associated pedal hardware and the pedal mounting surface can withstand a variety of different loads as it would encounter if the pedal were actually connected to a manual transmission or braking system.

It is also contemplated that an electronic measuring device (not shown) could be added to the adjustable simulator system 100 in connection with the push rod 105 in order to measure the actual load at the push rod 105.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An adjustable simulator apparatus comprising:
   a housing having a bore along a generally longitudinal axis;
   an inwardly extending shoulder of the housing as a first retainer and a second retainer disposed in the housing and spaced apart from one another along the longitudinal axis, wherein at least one of the first and the second retainer is adjustable in its position;
   a compressible member having a first end and a second end disposed between the first retainer and the second retainer;
   a mechanical stop disposed at least partially within the bore of the housing and extending longitudinally within the second end of the compressible member;
   a piston translatable within the bore; and
   an end cap attached to a distal end of the housing, where the second retainer and the mechanical stop are threaded through the end cap into the housing.

2. The adjustable simulator apparatus as in claim 1, wherein the mechanical stop is adjustable in its position along the bore.

3. The adjustable simulator apparatus as in claim 2, wherein the mechanical stop is a threaded bolt.

4. The adjustable simulator apparatus as in claim 1, wherein the housing has a first diameter at a proximate end of housing and a second diameter at a distal end of housing, wherein the second diameter is larger than the first diameter.

5. The adjustable simulator apparatus as in claim 1, wherein the second retainer is threaded directly to a distal end of the housing.

6. An adjustable simulator apparatus comprising:
   a cylindrical housing having a bore along a generally longitudinal axis;
   an inwardly extending shoulder of the cylindrical housing as a first retainer and a second retainer disposed within the cylindrical housing and spaced apart from one another along the longitudinal axis, wherein the second retainer is a bolt adjustable in its position along the bore to change the distance between the first retainer and second retainer;
   a spring element having a first end and a second end disposed between the first retainer and the second retainer and compressible along the bore of the cylindrical housing;
   a plate disposed within the bore between the first retainer and the second retainer and between the first retainer and the spring, the plate having a first face and a second face, the second face of the plate in contact with the spring element;
   a mechanical stop disposed longitudinally within the bore of the cylindrical housing and extending through the second end of the spring element, wherein the mechanical stop is a bolt adjustable along the bore and its position is changeable; and
   a piston translatable within the bore to come into contact with the first face of the plate.

7. The adjustable simulator apparatus as in claim 6, wherein the piston has a start position and a stop position within the cylindrical housing.

8. The adjustable simulator apparatus as in claim 7, wherein the stop position is the position at which the longitudinal movement of the piston within the cylindrical housing is impeded by the mechanical stop.

9. The adjustable simulator apparatus as in claim 7, wherein a distance from the start position to the stop position of the piston ranges from about 0.50 inches to about 1.0 inch.

10. The adjustable simulator apparatus as in claim 6, further comprising:
   an annular washer disposed between the second end of the spring element and the second retainer.

11. An adjustable simulator system comprising:
   an adjustable simulator apparatus comprising:
      a cylindrical housing having a bore along a generally longitudinal axis;
      an inwardly extending shoulder of the cylindrical housing as a first retainer and a second retainer disposed within the cylindrical housing and spaced apart from one another along the longitudinal axis, wherein the second retainer is a bolt adjustable in its position along the bore to change the distance between the first retainer and second retainer;
      a spring element having a first end and a second end disposed between the first retainer and the second retainer and compressible along the bore of the cylindrical housing;
      a plate disposed within the bore between the first retainer and the second retainer and between the first retainer and the spring, the plate having a first face and a second face, the second face of the plate in contact with the spring element;
      a mechanical stop disposed longitudinally within the bore of the cylindrical housing and extending through the second end of the spring element, wherein the mechanical stop is a bolt adjustable along the bore and its position is changeable; and
      a piston translatable within the bore to come into contact with the first face of the plate;
   an associated linearly translatable rod operatively connected to the piston; and
   an associated slave device integral to the rod.

12. The adjustable simulator system as in claim 11, further comprising an associated pedal operatively connected to the associated slave device.

13. The adjustable simulator system as in claim 11, further comprising:
   a mounting apparatus for maintaining the cylindrical housing and slave device in an axial relationship.

* * * * *